United States Patent
Lange et al.

(10) Patent No.: US 11,655,183 B2
(45) Date of Patent: May 23, 2023

(54) SYSTEM AND METHOD FOR OPTICAL FIBER PREFORM PREPARATION VIA HIGH-SURFACE-AREA COATING

(71) Applicant: Lawrence Livermore National Security, LLC, Livermore, CA (US)

(72) Inventors: Andrew Lange, Livermore, CA (US); Jay W. Dawson, Livermore, CA (US); Rebecca Dylla-Spears, Dublin, CA (US); Cody Wren Mart, Livermore, CA (US); Michael J. Messerly, Danville, CA (US); Koroush Sasan, Pleasanton, CA (US); Nick Schenkel, Livermore, CA (US); Tayyab I. Suratwala, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 260 days.

(21) Appl. No.: 16/899,069

(22) Filed: Jun. 11, 2020

(65) Prior Publication Data
US 2021/0387903 A1   Dec. 16, 2021

(51) Int. Cl.
*C03B 37/027* (2006.01)
*C03B 37/15* (2006.01)
(Continued)

(52) U.S. Cl.
CPC .... *C03C 17/3636* (2013.01); *C03B 37/02727* (2013.01); *C03B 37/16* (2013.01)

(58) Field of Classification Search
CPC .......... C03B 37/02727; C03B 37/0753; C03B 37/15; C03C 25/002
See application file for complete search history.

(56) References Cited

U.S. PATENT DOCUMENTS 3,869,335 A * 3/1975 Siefert .................... C03C 10/16
                                                       65/444
4,127,398 A * 11/1978 Singer, Jr. ............. C03B 37/15
                                                       65/393
(Continued)

FOREIGN PATENT DOCUMENTS

WO   WO-03033423 A1 *  4/2003 ........... C03B 37/016
WO   WO-2018071844 A1    4/2018

OTHER PUBLICATIONS

International Search Report and Written Opinion regarding International Application No. PCT/US2021/030425, dated Aug. 24, 2021.

(Continued)

*Primary Examiner* — Cynthia Szewczyk
(74) *Attorney, Agent, or Firm* — Harness, Dickey & Pierce, P.L.C.

(57) ABSTRACT

The present disclosure relates to a method for forming a glass, ceramic or composite material. The method may involve initially forming a plurality of tubes and then performing a coating operation to coat the plurality of tubes with materials containing metal or metalloid elements, including inorganic compounds, organometallic compounds, or coordination complexes to form coated tubes. The method may further include performing at least one of a thermal operation or a thermochemical operation on the coated tubes to form a solid glass, ceramic, or composite structure with dimensions representing at least one of a rod or fiber.

25 Claims, 11 Drawing Sheets

(51) Int. Cl.
*C03C 17/36* (2006.01)
*C03B 37/16* (2006.01)

(56) References Cited

U.S. PATENT DOCUMENTS

| | | |
|---|---|---|
| 4,707,174 A | 11/1987 | Johnson, Jr. et al. |
| 5,250,096 A | 10/1993 | Bruce et al. |
| 5,254,508 A | 10/1993 | Kirkbir et al. |
| 6,711,918 B1 | 3/2004 | Kliner et al. |
| 6,889,528 B2 | 5/2005 | Sen et al. |
| 6,928,220 B2 | 8/2005 | Wang et al. |
| 7,089,765 B2 | 8/2006 | Schaper et al. |
| 7,100,400 B2 | 9/2006 | Bhandarkar et al. |
| 7,155,098 B2 | 12/2006 | Jang et al. |
| 7,874,180 B2 | 1/2011 | MacChesney et al. |
| 7,946,134 B2 | 5/2011 | Atkins et al. |
| 8,011,208 B2 | 9/2011 | Balakrishnan et al. |
| 8,557,171 B2 | 10/2013 | Langner et al. |
| 8,958,674 B2 | 2/2015 | Pastouret et al. |
| 2003/0147606 A1 | 8/2003 | Wang et al. |
| 2004/0005127 A1 | 1/2004 | Kliner et al. |
| 2008/0041111 A1 | 2/2008 | MacChesney et al. |
| 2011/0061478 A1* | 3/2011 | Ivanov .................. C03B 37/028 427/98.5 |
| 2019/0375672 A1 | 12/2019 | Chandra et al. |

OTHER PUBLICATIONS

Schuster, Kay, et al. "Material and Technology Trends in Fiber Optics." Advanced Optical Technologies, vol. 3, No. 4, 2014, pp. 447-468. doi:10.1515/aot-2014-0010.

* cited by examiner

Cross-sectional image of thin SiO$_2$ tubes coated with doped porous SiO$_2$

Cross-sectional image of thin $SiO_2$ tubes after consolidation of coatings bundled in a close-packed arrangement within an $SiO_2$ glass tube FIGURE 3b2

Collapsed bundle of coated $SiO_2$ tubes. Note outer diameter of structure has been reduced relative to Figure 3b1 due to removal of void volume FIGURE 3c1

7 stacked canes in a close packing arrangement with doped domains (dark grey) consistent with the original bundle of coated tubes Collapsed canes with doped domain pattern consistent with stacked bundle of canes. Note, outer diameter of cylinder has been reduced due to elimination of void volume during collapse.

X2 bundled and collapsed canes after removal of outer $SiO_2$

Pre-fused array of SiO₂ tubes after step 304 in Figure 5.

SYSTEM AND METHOD FOR OPTICAL FIBER PREFORM PREPARATION VIA HIGH-SURFACE-AREA COATING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to the manufacture of fiber preforms, and more specifically to systems and methods for coating and processing high surface area glass substrates to load additional chemical species into the glass matrix in a manner which enables larger volumes of mixed glass materials to be generated and the composition and concentrations to be easily selectively varied during the forming of the fiber preform.

BACKGROUND

The statements in this section merely provide background information related to the present disclosure and may not constitute prior art.

Optical fibers are essential components within many light-wave communication systems, chemical and mechanical sensing devices, and high power lasers. SiO2-based fibers within these systems are typically doped to modify their physical/optical properties or to introduce lasing ions for amplification/gain. For example, modern fiber lasers require the composition of constituent glass fibers to be appropriately tuned to tailor properties such as their coefficient of thermal expansion, optical absorption, and optical emission in a way that optimizes the lasing efficiency of the fiber.

Figure 1:
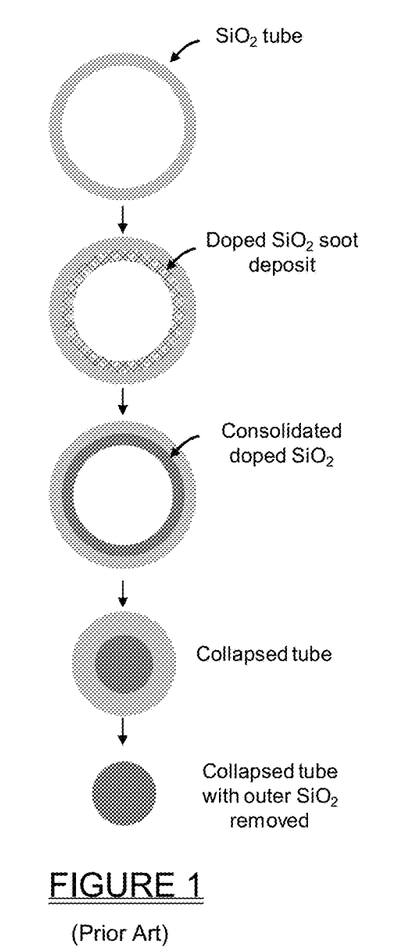
FIG. 1 is a diagram illustrating the prior art MCVD process for constructing doped optical fiber preforms.

Doped fiber preforms are conventionally made by one of several methods. These include (1) the "modified chemical vapor deposition (MCVD)" process, summarized in FIG. 1, (2) the "plasma chemical vapor deposition (PCVD)" process, (3) powder sintering approaches, and (4) molten glass techniques.

In the MCVD approach (1), $SiCl_4$ (or another volatile compound containing Si) is pyrolyzed in the presence of $O_2$ inside a high-purity $SiO_2$ tube which results in the formation of a porous $SiO_2$ soot deposit. The deposited soot can be doped by either introducing a gas containing the dopant ion during deposition or by soaking the deposited soot in a liquid solution that contains salts of the ions of interest. The latter is commonly referred to as solution doping. The doped soot is then consolidated to form a solid, glassy film. Subsequently, the tube is collapsed by melting it under vacuum on a glass lathe using either a hydrogen-oxygen torch or a high-temperature furnace. This well-established MCVD approach is commonly used to make fiber preforms with core/cladding structures. However, since unconsolidated soot is delicate, the solution-doped volume tends to be small, typically falling between one-tenth of a cubic centimeter and one cubic centimeter.

The PCVD approach is similar to the MCVD approach, however instead of thermally decomposing the precursors using a heat source in the form of a flame or furnace, the volatile Si precursor is partially or fully decomposed using a plasma generated with high energy microwave or radio frequency power sources. Due to the high kinetic energy of the plasma deposition process, PCVD generally deposits non-porous coatings which do not require an additional consolidation step. Consequently, additional species cannot be introduced by solution doping as the solution would not penetrate the dense coatings. Therefore, in PCVD, the dopant species must be introduced in the gas phase which limits the use of precursors with low vapor pressures (typical of rare earth metals).

A number of powder sintering approaches have been proposed and demonstrated in which a preform is generated by (i) forming a green body from a slurry of mixed oxide particles, then (ii) drying, (iii) calcining, and (iv) sintering that green body. These approaches are particularly well suited to the formation of large volumes of material with targeted compositions as the components in the glass can be easily tuned by adding additional particles or precursors to the slurry formulation. However, powder sintering requires careful optimization of thermal and thermochemical conditioning parameters to ensure the final preform does not crack, the constituents do not phase separate into clusters, and the initial solvents and ligands (e.g. carbon-rich materials) are adequately removed. Further, as the starting slurry often utilizes particles of each oxide constituent, the compositional homogeneity of the final material is typically poor. While high quality preforms have been demonstrated by the powder sintering approach, each new material composition involves its own challenges and substantial investment of resources and time to optimize its development.

Glass melt techniques have also been used to make preforms for fibers. Melting techniques can provide large quantities of doped glass, but the technique can suffer from lower purity and phase separation of dopant oxides. Moreover, to keep the process economical the host glass generally melts at temperatures below 1000 C, and thus the resulting doped glass often cannot tolerate the high temperatures generated within high-power lasers.

SUMMARY

This section provides a general summary of the disclosure, and is not a comprehensive disclosure of its full scope or all of its features.

In one aspect the present disclosure relates to a method for forming a glass, ceramic or composite preform material. The method may comprise forming a matrix of glass with a high internal surface area. The method may further comprise performing a coating operation to coat the matrix of glass with materials containing metal or metalloid elements, including inorganic compounds, organometallic compounds, or coordination complexes to form a coated matrix of glass before or after fusing constituents of the matrix into a single structure. The method may further include performing at least one of a thermal operation or a thermochemical operation on the matrix of glass to form a solid glass, ceramic, or composite structure with dimensions representing at least one of a rod or a fiber.

In another aspect the present disclosure relates to a method for forming a mixed composition glass preform. The method may comprise forming a plurality of high purity $SiO_2$ glass tubes. The method may also comprise coating the plurality of tubes with a porous $SiO_2$ network to form coated $SiO_2$ tubes. The method may further include submerging the coated $SiO_2$ tubes in one or more solutions to incorporate dopants. The method may further include densifying and purifying the coating of the $SiO_2$ tubes using thermochemical treatments. The method may further include collapsing the bundled or assembled collection of coated $SiO_2$ tubes using a thermal operation to form a solid optical preform having varied compositional domains, and then pulling the solid optical preform into a rod shape.

In still another aspect the present disclosure relates to an optical fiber. The optical fiber may comprise a plurality of coated $SiO_2$ tubes coated with $SiO_2$ particles. The plurality of coated tubes further have dopant species including inorganic compounds, organometallic compounds, or coordination complexes deposited thereon. The plurality of coated tubes have been consolidated and collapsed to form a preform, and then pulled into a fiber having a desired shape, wherein the fiber forms an optical fiber made up of a plurality of tightly packed, coated, consolidated and collapsed tubes.

Further areas of applicability will become apparent from the description provided herein. It should be understood the description and specific examples are intended for purposes of illustration only and are not intended to limit the scope of the present disclosure.

BRIEF DESCRIPTION OF THE DRAWINGS

The drawings described herein are for illustrative purposes only of selected embodiments implementations and not all possible embodiments and implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure solves present day volumetric and purity issues regarding the construction of modern optical fibers. In particular, the present disclosure involves new systems and methods which involve the use of coating to layer dopant material onto a high surface-area substrate which is subsequently thermochemically treated, consolidated and collapsed. An overview of one example of a manufacturing process in accordance with the present disclosure which involves glass tubes will be described in connection with a flowchart 100 shown in FIG. 2, and also with high level diagrams 3a-3e. The process described in the flowchart 100 may readily be extended to other substrates with high surface areas such as etched glass and fused glass structures comprised of, by example, tubes, rods, beads, or particles. For the following discussion, however, the process of the present disclosure will be described in connection with manufacturing a selectively doped optical fiber preform using individually coated and assembled $SiO_2$ tubes.

Figure 2:
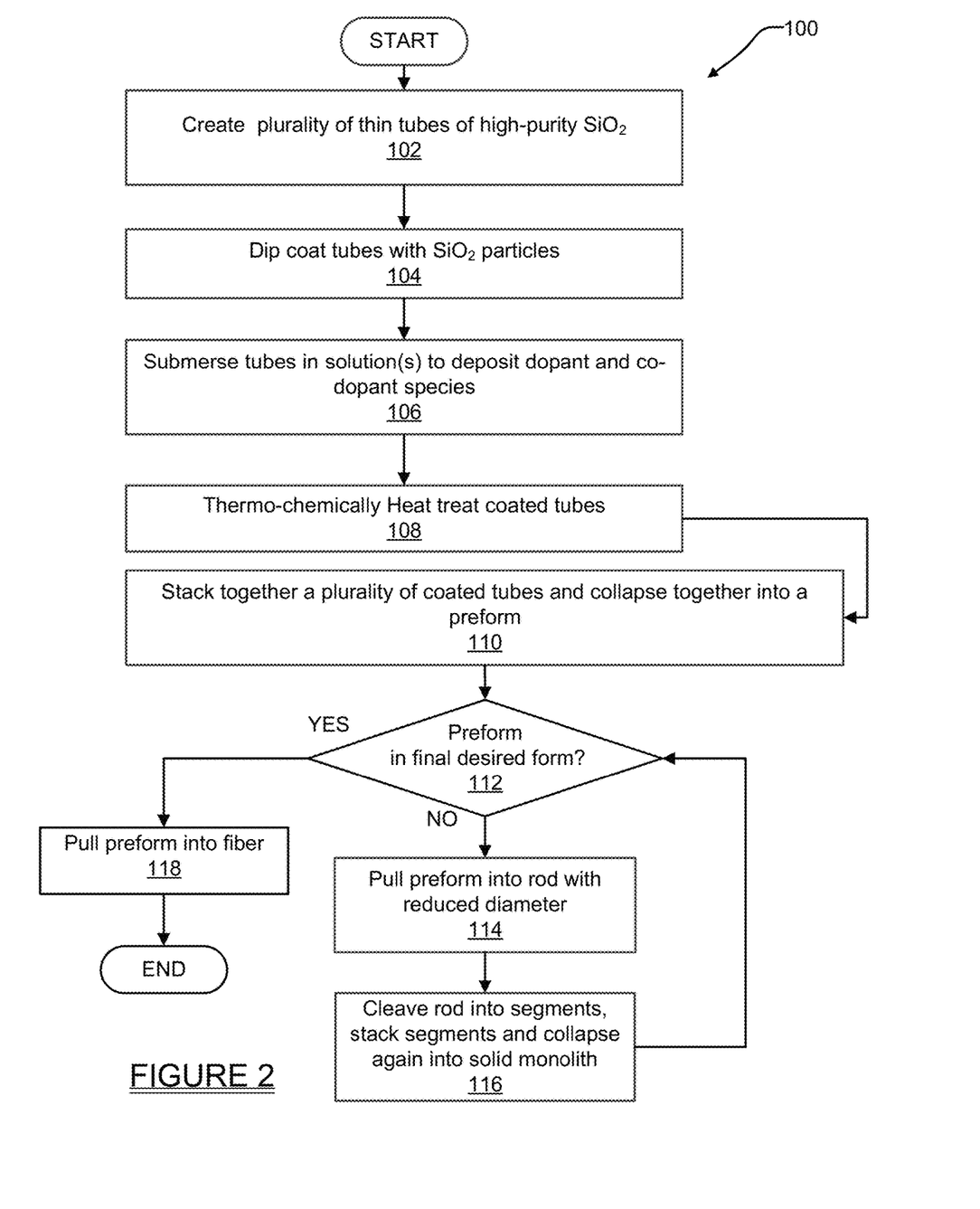
FIG. 2 is a flowchart illustrating various operations that may be performed in accordance with the present disclosure to create selectively doped, optical fiber preforms.
Figure 3A:
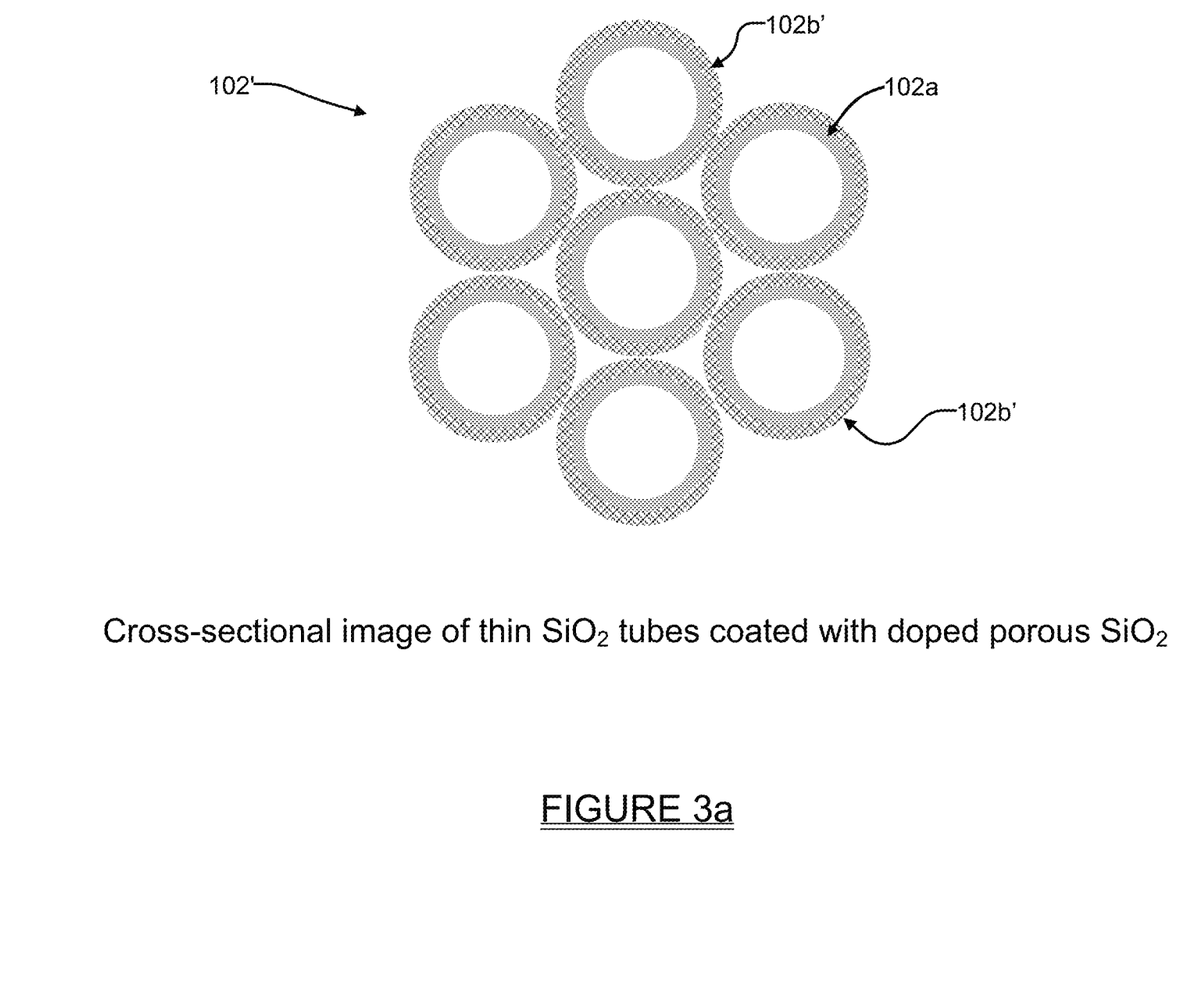
FIGS. 3a-3e show simplified diagrams to help illustrate the operations described in FIG. 2 in constructing a selectively doped optical fiber preform in accordance with the present disclosure.

At operation 102 in FIG. 2, a plurality of thin, ~10-100 μm, glass tubes of high-purity glass with diameters of 1 mm-3 mm and more typically about 1 mm in diameter, are made using a fiber tower (not shown) in the conventional manner. FIG. 3a shows a plurality of such $SiO_2$ tubes 102' assembled together. The doped $SiO_2$ tubes in this embodiment are formed by coating the fused silica tubes 102a' with a porous doped $SiO_2$ coating 102b', composed of particles or gels of a particular composition synthesized by, for example, pyrolysis, sol-gel processes or other conventional means, as indicated at operation 104 in FIG. 2.

At operation 106 the coated tubes 102' are then (optionally) dipped (i.e., submerged) into multiple solutions of salts or suspensions of colloids to further deposit dopant and co-dopant species (e.g., Nd, Yb, Er, Ho, P, Tm, Sm, Eu, Pm, U, Ge, Ga, B, Ba, Al, Ce, or any other salts or suspended oxides of interest) akin to conventional solution doping.

Figure 3B:
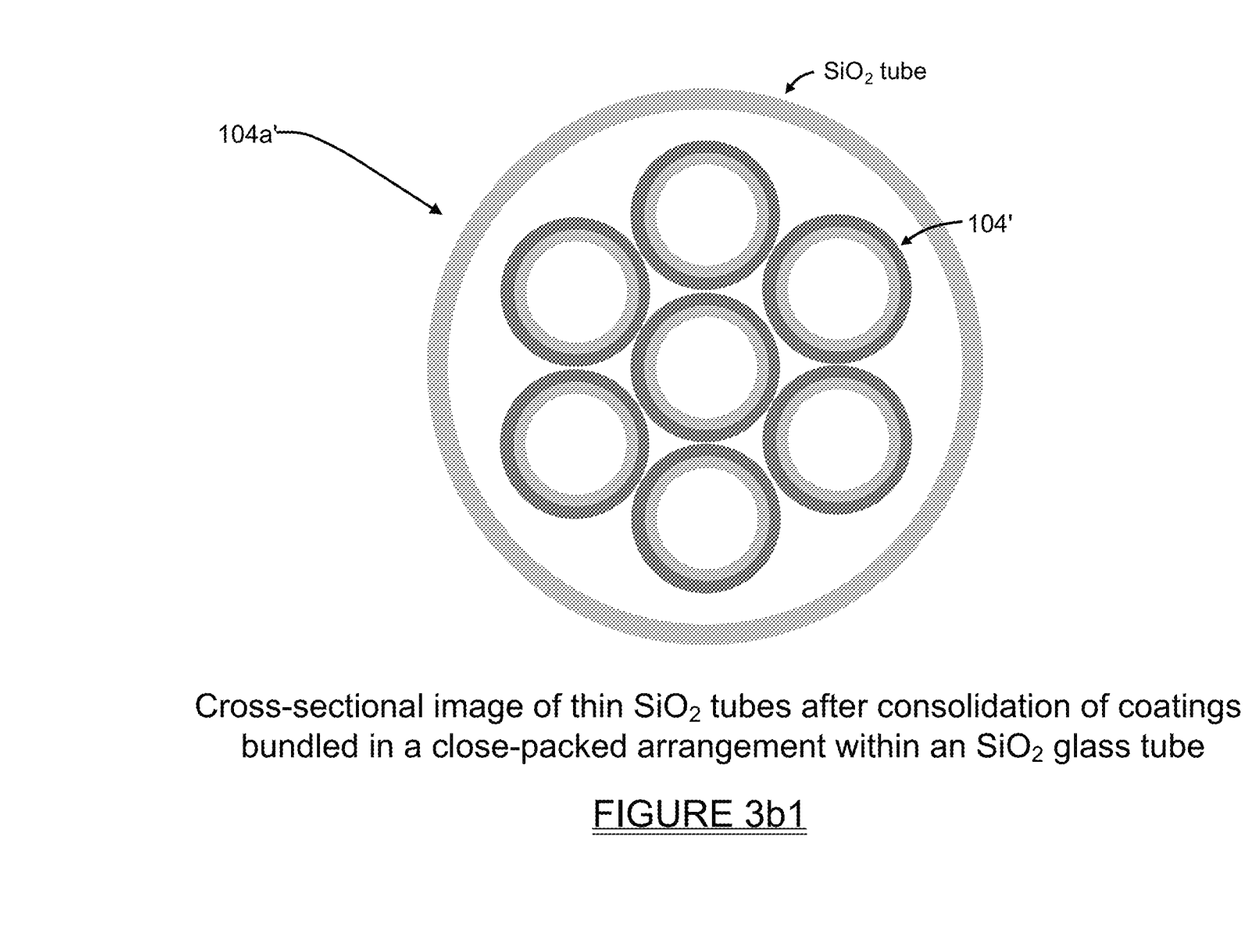

At operation 108 in FIG. 2 the coatings are then partially or fully consolidated and purified using thermochemical treatments. The high temperature thermal treatments may vary depending on the specific coatings being used. Thermal treatments may include, for example, evaporating residual solvent (T>100° C.), calcining the salts and residual organics (T>400° C.), and sintering to increase the density of the coating (T>1000° C.). It will be appreciated that all temperatures given are material dependent. Chlorine or other reactive gases may be used during the thermal treatment to increase the desorption of hydroxyls or other impurities from the oxide surfaces. The consolidated coatings 104' on the tubes are shown in FIG. 3b1.

Figure 3B:
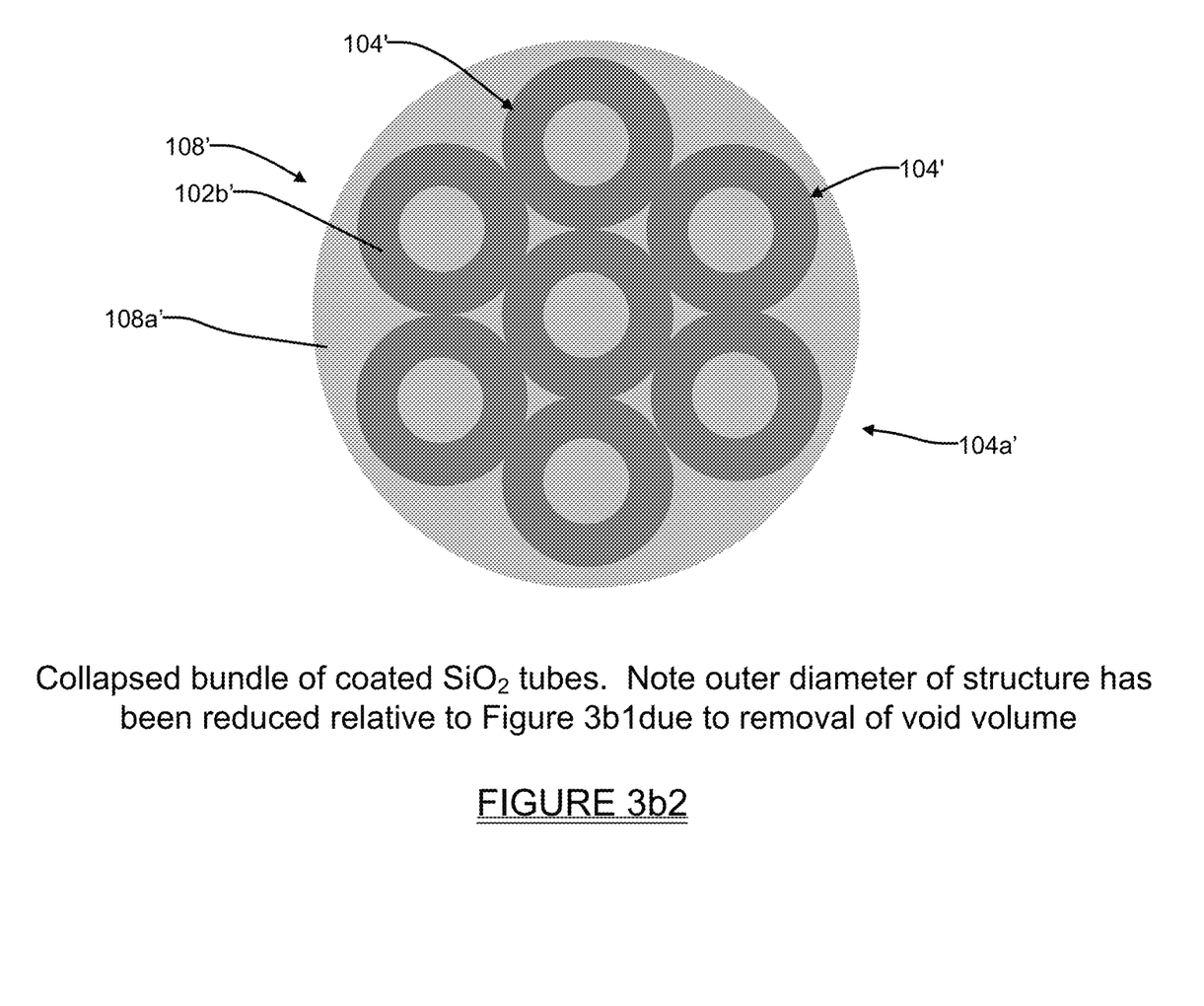
Figure 3C:
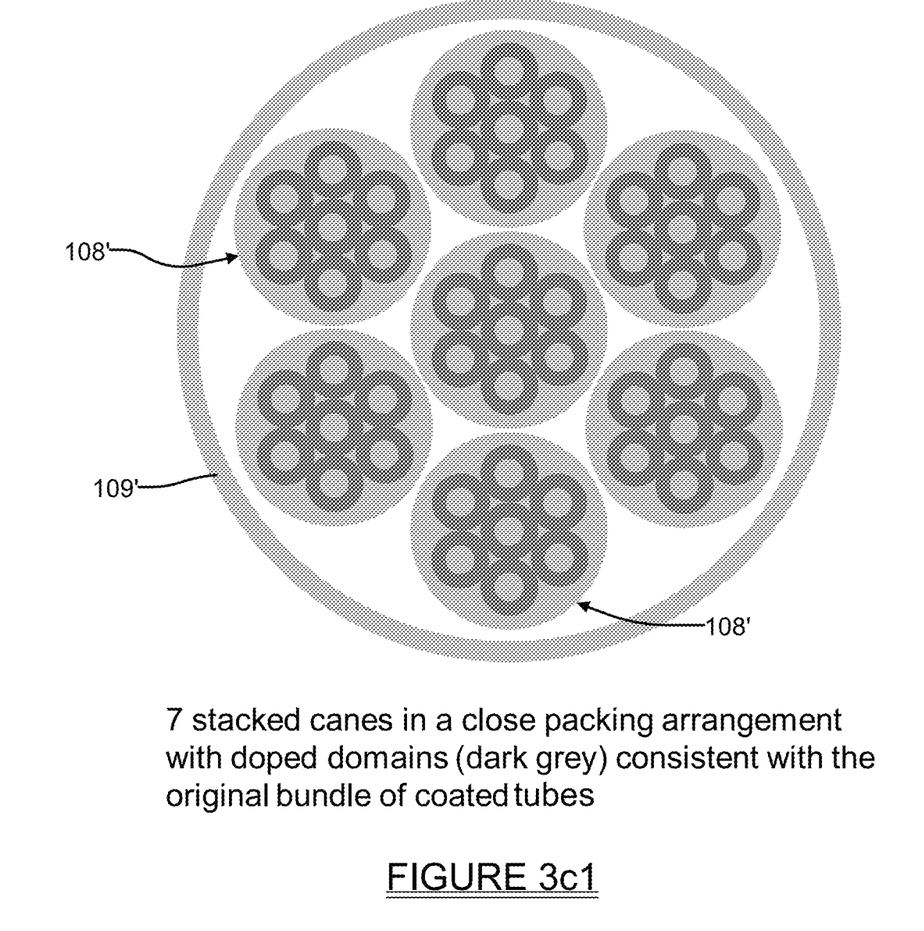
Figure 3C:
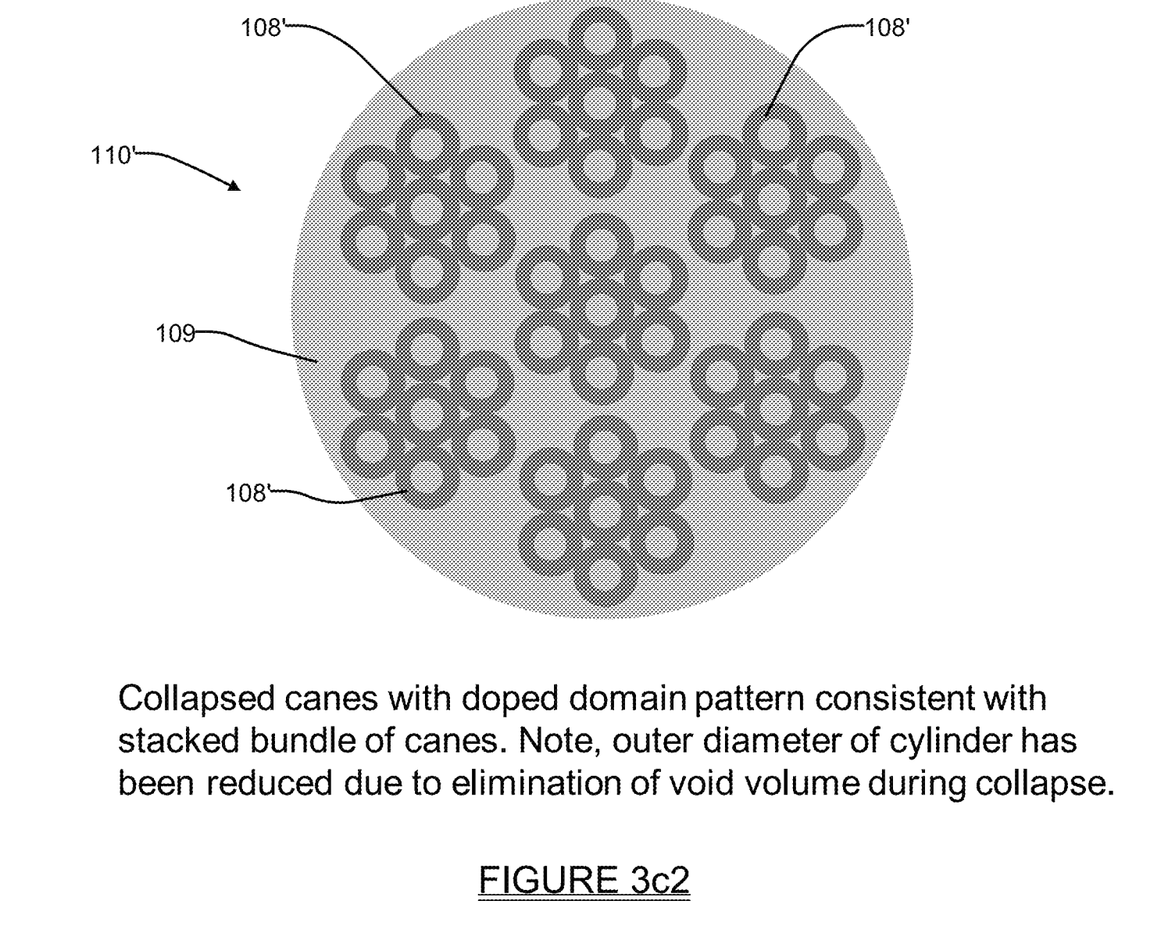

The coated tubes are then stacked inside of a larger $SiO_2$ tube 104a' as shown in FIG. 3b1 and collapsed into a solid monolith 108' as shown in FIG. 3b2 and described in operation 110. The stacked tubes 104' are collapsed using, by example but not limitation, a lathe/hydrogen-oxygen torch or fiber tower furnace, to form a finished preform. It will be noted that the $SiO_2$ tube 104a' in FIG. 3b1 has been collapsed as well, and now forms a generally continuous outer sheathing 108a'. It will also be noted that in this condition the air within and between the $SiO_2$ tubes (FIG. 3b1) has been removed, thus the $SiO_2$ tubes collapse to form rods with a solid internal area. The geometry of the doped domains in 108' is consistent with the original bundle of coated tubes. While it appears that the cross-sectional thickness of the doped domains in 104' has increased, this is to illustrate that the total diameter of the preform has decreased due to the removal of air, while the thickness of the coating has remained nearly constant through the collapsing process, with the exception of any necking or elongation of the entire structure along its long axis.

The resulting preform 108' shown in FIG. 3b2 has micrometer-sized domains of high and low dopant concentrations. When the preform is drawn to an optical fiber, the domains may be reduced in size by a factor of ten or more, to dimensions comparable to or smaller than the wavelength of the light intended to be guided by the optical fiber. In such cases, the waveguide often behaves as though the domains were homogenized at the molecular level.

Figure 3D:
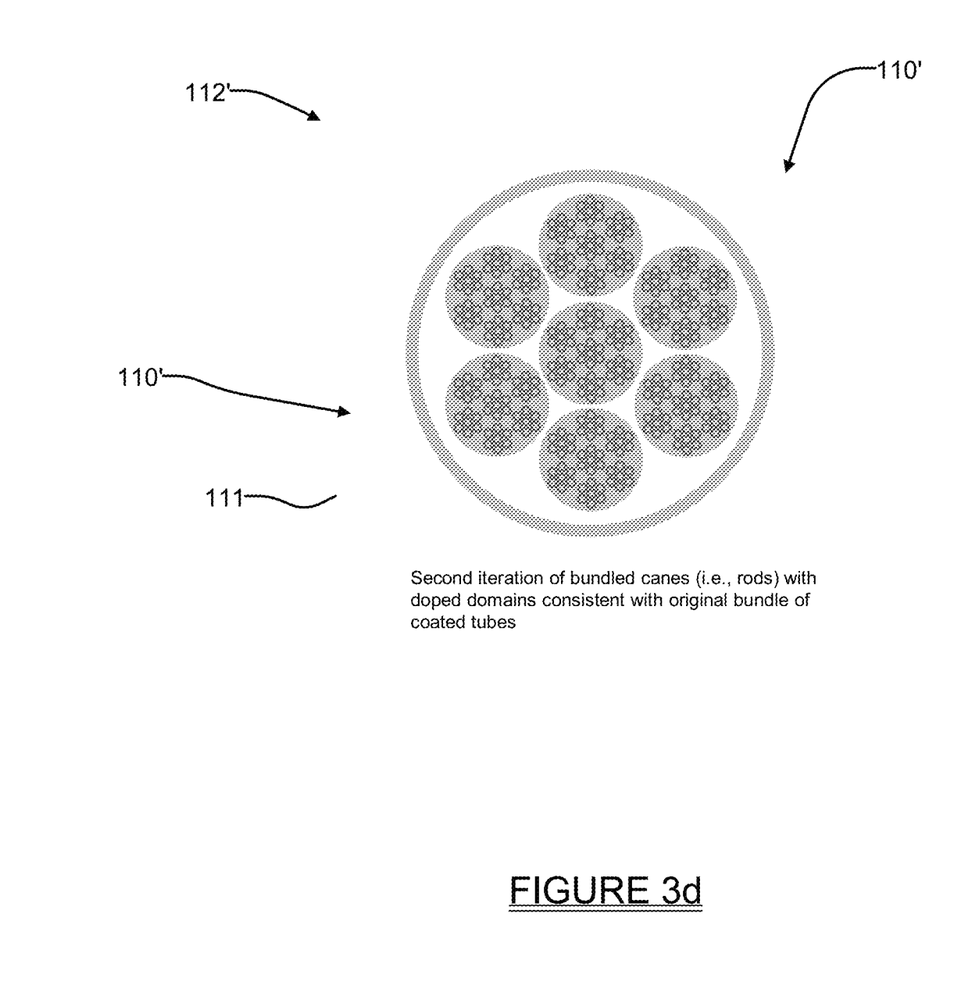
Figure 3E:
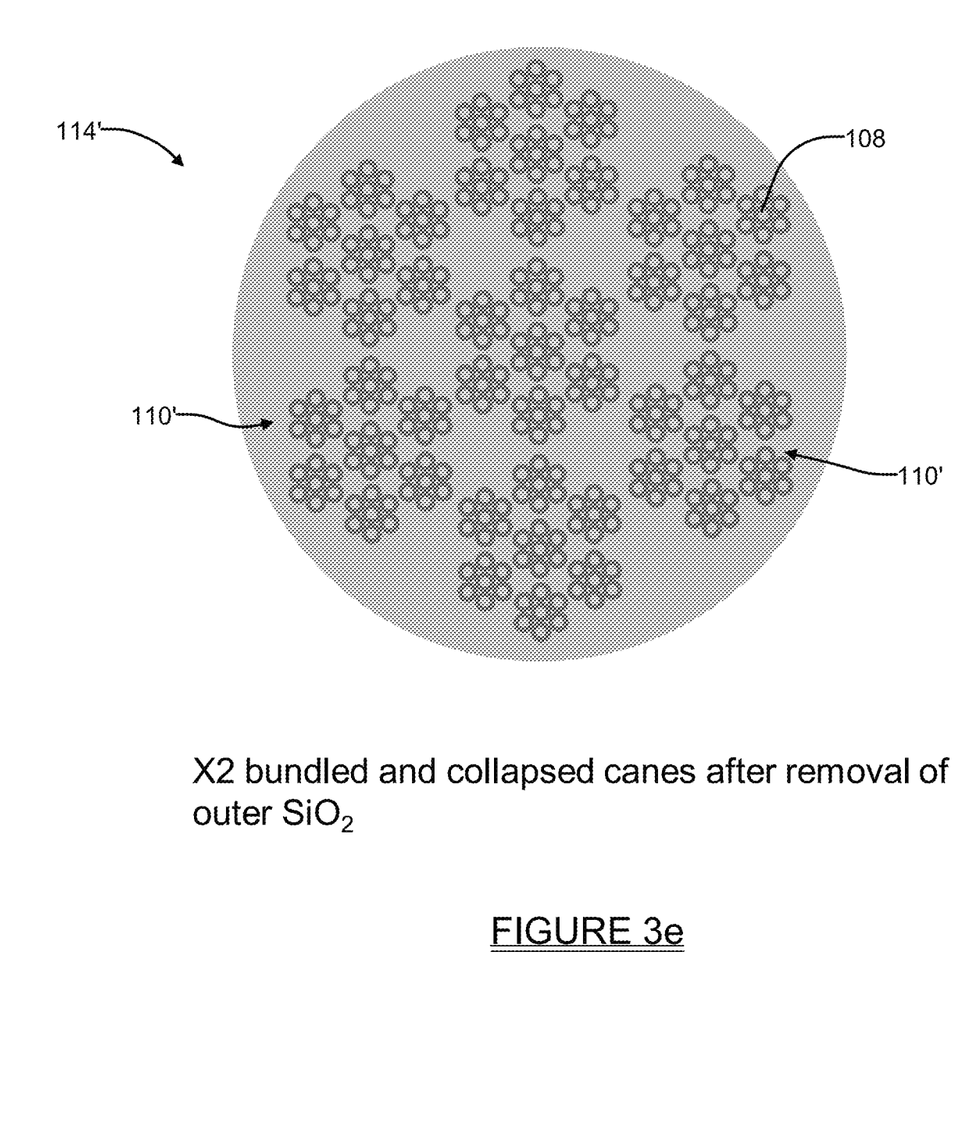

With continuing reference to FIG. 2, at operation 112 a check may be made if the preform is in a final desired form. If this check produces a "No" answer, then at operation 114 further "blending" may be accomplished if the domains are unwanted due to degrading optical effects by pulling the collapsed preform into a rod shape. At operation 116, the rod may then be cleaved into individual segments, and those individual segments stacked into an assembly within a larger SiO$_2$ tube 109' (shown in FIG. 3c1) and collapsed into a solid monolith 110' (shown in FIG. 3c2), for example by again using a lathe and hydrogen/oxygen torch, high temperature furnace, fiber draw tower, or some combination of these subsystems. Another check may then be made at operation 112 to determine if the domains are in the final desired shape (or form). If the preform is not in the final desired shape or form, operation 114 may be repeated in which the newly formed preform 110' may then be optionally drawn into a rod again with that rod being cut and stacked into another SiO$_2$ sleeve 112' as shown in FIG. 3d and collapsed into another preform 114' with smaller domain sizes as shown in FIG. 3e. At operation 112 another check is made if the preform is in its final desired form, and if not, operations 114 and 116 may be repeated as many times as is necessary to homogenize the glass until the preform is in the final desired form. Once the check at operation 112 indicates a "Yes" answer, then the preform may be pulled into a fiber as indicated at operation 118.

Figure 4:
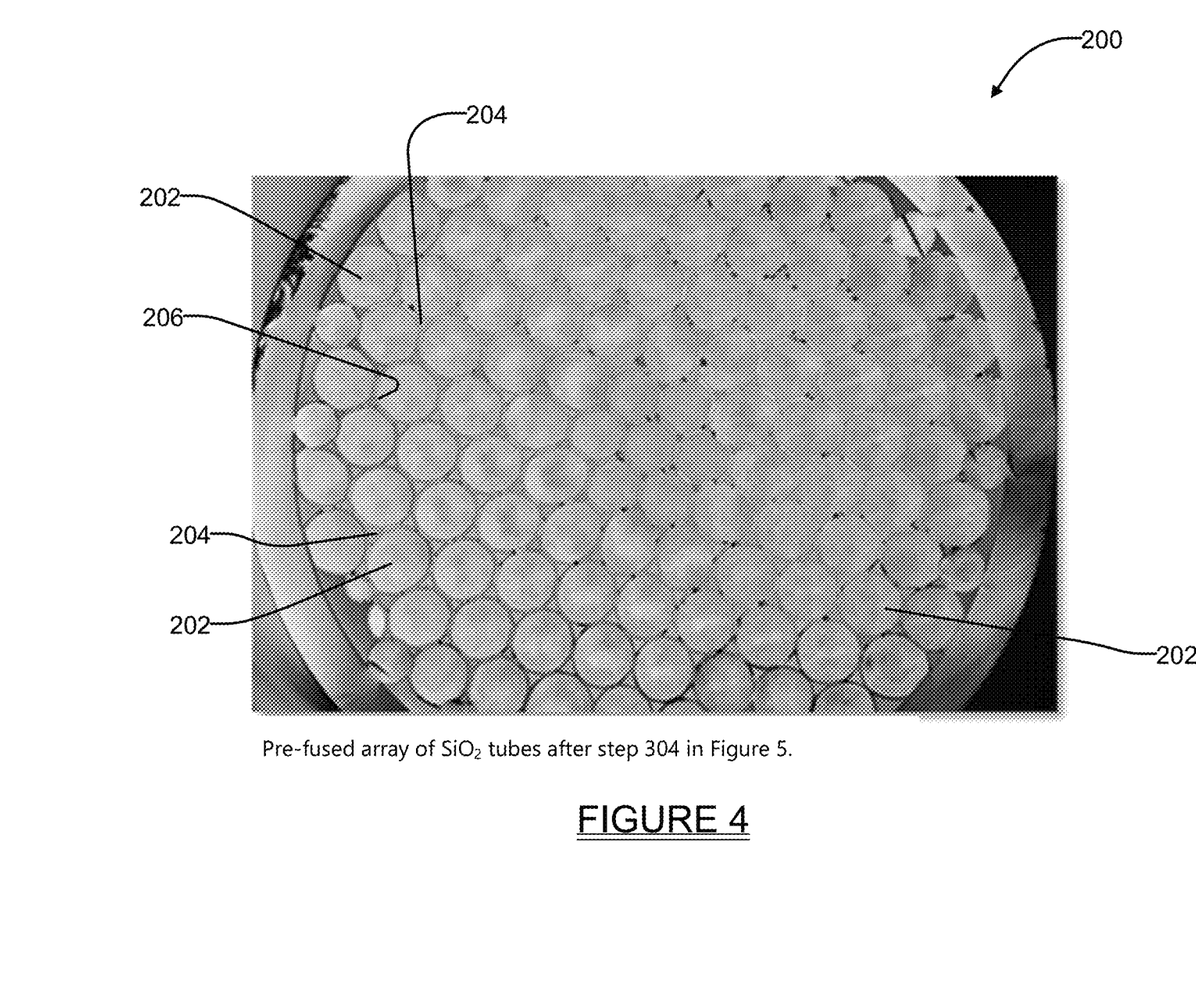
FIG. 4 shows a high surface area matrix of glass made in accordance with another method of the present disclosure where the elements of the preform begin as thin tubes which are assembled together before being coated and collapsed.

Referring to FIG. 4, a high surface area substrate 200 constructed in accordance with another method of the present disclosure is shown. The high surface area substrate 200 is initially formed by fusing together a collection of SiO$_2$ tube elements 202. The fused elements 202 will have their unfused surfaces coated by flowing either a liquid solution, or gas precursors, over their surfaces. The liquid solution process may involve the use of SiO$_2$ particles, gels, other oxide particles, or dopant salts similar to the dip coating process described above. The gas precursor coating process may involve coating the consolidated collection of elements 200 using a vapor-phase deposition process using by example silicon tetrachloride and oxygen or other volatile precursor compounds. The result of this process is an increase in the internal surface area that is coated by the solution or gas precursor compared to the prior art. The coatings can then be thermochemically treated and the structures collapsed to a solid preform through one or more operations as described above for the construction of the preform 114'.

Figure 5:
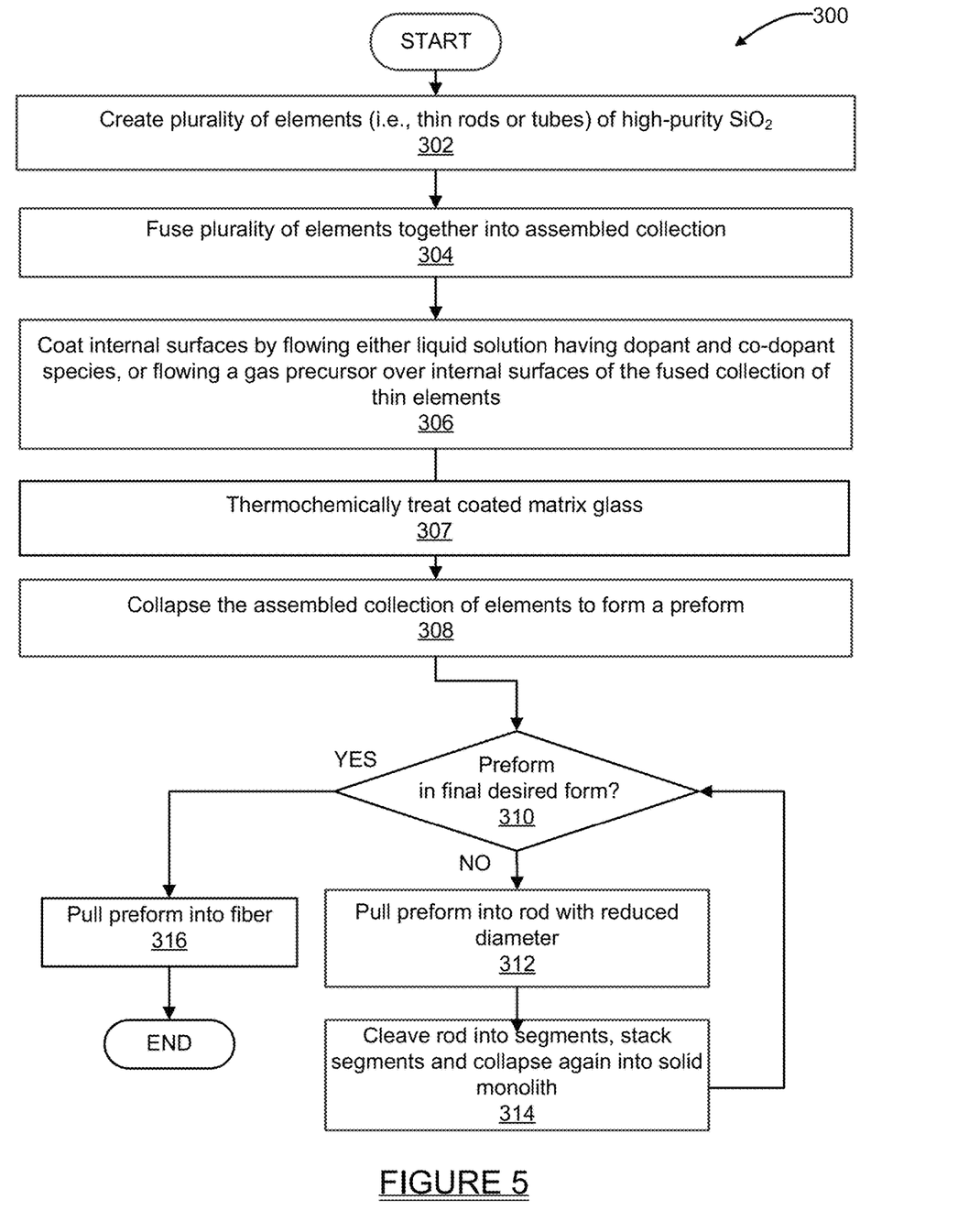
FIG. 5 shows a method used to make a preform starting from a high surface area matrix of glass such as the one shown in FIG. 4.

Referring to FIG. 5 a flowchart 300 is shown to further explain the construction of the preform from the pre-fused matrix of glass 200. Operation 302 involves creating the thin elements 202 as thin tubes or rods of high-purity SiO$_2$. At operation 304 the plurality of thin elements 202 are fused into a fused collection of elements or a matrix of glass. At operation 306 the internal surfaces are coated by flowing either a liquid solution containing SiO$_2$ precursors, SiO$_2$ particles, and dopant species over the internal surfaces, or by flowing one or more gas precursor over the internal surfaces of the fused collection of elements 202 in the presence of a heat or plasma source to decompose the precursors thereby coating the internal surfaces with a dopant compound. At operation 307 the coated matrix of glass is thermochemically treated.

Operation 308 involves collapsing the coated matrix of glass 202 (FIG. 4) into a solid monolithic preform using a lathe, hydrogen/oxygen torch, high temperature furnace, fiber tower, or a combination thereof.

Operation 310 involves making a check if the preform is in a final desired shape or form, and if not, then operation 312 is performed to pull the preform into a rod with a reduced diameter. At operation 314 the rod may be cleaved into multiple segments, the segments stacked, and then collapsed again into a solid monolith. Operations 312 and 314 may be repeated to cut the rod and stack it into another SiO$_2$ tube, and again collapsing the structure to further decrease the size of the doped domains. When the check at operation 310 indicates the preform is in its final desired form or shape, then the preform may be pulled into a fiber, as indicated at operation 316. Thus, operations 310-316 are similar to operations 112, 114, 116 and 118, respectively, of FIG. 2. After the preform is finally pulled into a fiber at operation 316, then the process is complete.

While the foregoing methods have described constructing an optical fiber preform, it will be appreciated that the methods of the present disclosure are not limited to only constructing an optical fiber preform. For example, and without limitation, the present disclosure may be used to construct glass rods for use as a feedstock material for additive manufacturing operations. Other possible uses of the present disclosure may be, for example, in constructing compositionally layered preforms. While conventional MCVD and PCVD may be used to create preforms with varied radial compositions, this is technically challenging due to the need to utilize volatile precursors for the dopants (e.g., in PCVD) or consolidate coatings prior to each solution doping step (e.g., in MCVD). Dip coating has the advantage of being able to vary the composition of the preforms radially as each layer can be dried quickly and the coating composition is determined by the composition of the coating solution; additionally, the coating thickness is determined by the parameters of the physical deposition process (e.g., withdrawal rate) rather than the chemistry of the dopant precursors. Substrates with varied shapes may also be used to embed doped domains in the final glass with varied geometries.

The proposed methods of preform preparation by high surface area coating and consolidation may be used to easily and economically manufacture fibers with unconventional compositions. The versatility of the methods described herein allow for the exploration of a wider variety of admixtures or dopants compared to many techniques in the prior art. Further, the methods described herein may be used to make fibers with compositional domains and with shapes that are not achievable with prior art methods. For example, one could coat half of the plurality of tubes with one composition and the other half with a different composition. The two pluralities of tubes could then be stacked in a desired arrangement (e.g., one composition forming one semicircle and the other composition forming the other semicircle). Upon consolidating the assembly of tubes and drawing the consolidated rod into fiber, one could then achieve a fiber core with, effectively, two semicircles with different indices of refraction, thermal expansion, or rare earth dopant concentration. Other fiber designs are also possible, for example a design in which the doped domains are not radially symmetric, which is a limitation of many prior art preform technologies. Accordingly, not just the methods of manufacture described herein are new and non-obvious, but the methods presented herein enable the construction of optical fibers (i.e., the articles themselves) with features/characteristics that would not be possible with pre-existing methods of optical fiber manufacture.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for forming a glass, ceramic or composite preform material comprising:
   forming a matrix of glass including at least one of individual tubes or rods, the at least one of individual tubes or rods having surfaces individually coated with materials containing metal or metalloid elements to form a coated matrix of glass, wherein a surface area of the matrix of glass exceeds, by more than a factor of two, an area of an interior surface of an imaginary cylinder or parallelepiped of a minimum size to enclose the matrix; and
   performing at least one of a thermal operation or a thermochemical operation on the coated matrix of glass to increase a density of the at least one of individual tubes or rods by reducing said matrix of glass to a solid volume of material, representing a single structure having interstitial spaces therewithin removed, with dimensions representing at least one of a solid rod or a fiber.

2. The method of claim 1, wherein the matrix of glass comprises a solid rod of ceramic or glass that has been etched to increase a surface area thereof and internal surfaces of the etched ceramic or glass is coated during the coating operation.

3. The method of claim 1, wherein the matrix of glass comprises a fused assembly of glass beads or particles and the surfaces of the assembly of beads or particles are coated during the coating operation.

4. The method of claim 1, wherein performing at least one of a thermal operation or a thermochemical operation comprises performing at least one of a sintering operation, a melt operation, a thermochemical reaction operation, or a collapse operation on an assembled collection of the coated matrix.

5. The method of claim 1, further comprising:
   performing a cutting operation to cut the rod/fiber into individual rod/fiber segments;
   performing an assembly operation to form an assembly of the individual rod/fiber segments;
   performing a collapsing operation to collapse the assembly of the individual rod/fiber segments again to another rod/fiber shaped glass; and
   repeating the cutting, assembly and the collapsing operations as needed to homogenize the composition of the glass.

6. The method of claim 5, wherein the repeated collapsing operation comprises repeatedly using a glass lathe and a hydrogen-oxygen flame.

7. The method of claim 5, wherein the repeated collapsing operation comprises repeatedly using a furnace.

8. The method of claim 1, further comprising forming a matrix of glass; and
   wherein the coating operation comprises coating the matrix of glass using a liquid solution coating operation.

9. The method of claim 8, wherein the matrix of glass is coated with $SiO_2$ particles or a porous $SiO_2$ structure.

10. The method of claim 8, wherein coating the matrix of glass using a liquid solution coating operation comprises submerging and soaking the matrix of glass in a solution containing precursors of desired dopant species.

11. The method of claim 10, wherein the desired dopant species comprise at least one of:
dissolved salts;
metalorganics; or
a suspension of oxide particles including at least one of Nd, Yb, Er, Ho, P, Tm, Sm, Eu, Pm, U, Ge, Ga, B, Ba, Al, La, Te, or Ce.

12. The method of claim 1, further comprising forming a matrix of glass; and
wherein the coating operation comprises coating the matrix of glass using a vapor-phase deposition process.

13. The method of claim 1, further comprising:
after performing the coating operation to coat the matrix of glass, bundling the at least one of the tubes rods into a bundled collection of tubes or rods prior to performing the thermochemical operation, and wherein the thermochemical operation comprises a thermochemical heat treatment operation to heat bundled collection of tubes or rods.

14. The method of claim 13, wherein the thermochemical heat treatment operation on the matrix of glass is performed using a furnace.

15. The method of claim 13, wherein the thermochemical treatment operation on the matrix of glass is performed using a torch.

16. The method of claim 1, wherein the at least one of a thermal operation or a thermochemical operation to collapse the matrix of glass into a solid volume of material is performed using a glass lathe/hydrogen-oxygen torch.

17. The method of claim 1, wherein the solid volume of material forms a preform from which optical fiber is drawn.

18. A method for forming a glass preform with a tailored composition, comprising:
forming a plurality of high purity $SiO_2$ glass tubes;
coating the plurality of tubes with a porous $SiO_2$ network to form coated $SiO_2$ tubes;
submerging the coated $SiO_2$ tubes in one or more solutions to incorporate additional chemical species;
densifying and purifying the coating of the $SiO_2$ tubes using thermochemical treatments;
collapsing a bundled or assembled collection of the coated $SiO_2$ tubes using a thermal operation to form a collapsed, cross-sectionally solid, optical preform with interstitial spaces between the coated $SiO_2$ tubes having been removed, and having varied compositional domains; and
pulling the collapsed solid optical preform into a cylinder with a diameter less than that of the collapsed solid optical preform.

19. The method of claim 18, further comprising processing the collapsed solid optical preform by repeated operations involving drawing the collapsed solid optical preform into rods with a reduced diameter to form reduced diameter rods, cutting the reduced diameter rods into individual segments, assembling the individual segments into a stacked array, and collapsing the stacked array to a solid rod of glass; wherein the drawing, cutting, assembling and collapsing operations are repeated one or more times to decrease the lateral dimensions of compositional gradients within the collapsed solid optical preform and to place the collapsed solid preform in its final shape.

20. The method of claim 18, wherein the plurality of $SiO_2$ tubes consists of individual pieces which are individually coated and later assembled into a single structure.

21. The method of claim 18, wherein the plurality of $SiO_2$ tubes comprises a fused assembly of $SiO_2$ tubes, and internal surfaces of the $SiO_2$ tubes are coated during a coating operation.

22. The method of claim 18, wherein coating the plurality of tubes with $SiO_2$ particles to form a porous $SiO_2$ network comprises using a liquid solution coating operation.

23. The method of claim 18, wherein the operation of submerging the coated $SiO_2$ tubes in a plurality of solutions to incorporate dopants includes submerging the coated tubes in solutions containing one or more of the following species: Nd, Yb, Er, Ho, P, Tm, Sm, Eu, Pm, U, Ge, Ga, B, Ba, Al, La, Te, or Ce.

24. The method of claim 18, wherein collapsing the bundled or assembled collection of coated $SiO_2$ tubes using a thermal operation comprises using a furnace.

25. The method of claim 18, wherein collapsing the bundled or assembled collection of coated $SiO_2$ tubes using a thermal operation comprises using a glass lathe/hydrogen-oxygen torch.

* * * * *